United States Patent
Tongu et al.

(10) Patent No.: US 9,617,894 B2
(45) Date of Patent: Apr. 11, 2017

(54) EXHAUST GAS PURIFICATION SYSTEM

(71) Applicant: Hino Motors, Ltd., Tokyo (JP)

(72) Inventors: Hirofumi Tongu, Hino (JP); Kuniharu Tobe, Hino (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/916,489

(22) PCT Filed: Sep. 30, 2014

(86) PCT No.: PCT/JP2014/076044
§ 371 (c)(1),
(2) Date: Mar. 3, 2016

(87) PCT Pub. No.: WO2015/064275
PCT Pub. Date: May 7, 2015

(65) Prior Publication Data
US 2016/0201539 A1 Jul. 14, 2016

(30) Foreign Application Priority Data
Oct. 31, 2013 (JP) .................. 2013-227160

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9431* (2013.01); *B01D 53/9477* (2013.01);
(Continued)

(58) Field of Classification Search
USPC ........................................... 422/172; 60/296
See application file for complete search history.

(56) References Cited

U.S. PATENT DOCUMENTS

2011/0079003 A1   4/2011   Sun et al.
2012/0124983 A1*  5/2012   Hong .................. B01F 3/04049
                                              60/324
(Continued)

FOREIGN PATENT DOCUMENTS

DE   102011088549 A1 *  6/2013  ........... F01N 3/2066
JP   2010-31769 A         2/2010
(Continued)

OTHER PUBLICATIONS

Gottwald, F. DE102011088549A1—translated document (2013).*
(Continued)

*Primary Examiner* — Walter D Griffin
*Assistant Examiner* — Jelitza Perez
(74) *Attorney, Agent, or Firm* — Kilpatrick Townsend & Stockton LLP

(57) ABSTRACT

An exhaust gas purification system includes an exhaust purifying element for purifying exhaust gas, and a selective reduction catalyst for promoting reduction of NOx contained in the exhaust gas with a reducing agent. A housing for accommodating the exhaust purifying element includes an outer wall having an accommodating portion. A supply hole is formed on a bottom of the accommodating portion. A pipe that is located inside the housing has a passage through which an interior of the pipe communicates with an exterior of the pipe. The pipe is configured to guide exhaust gas toward the selective reduction catalyst through the passage and the interior of the pipe. The pipe has an end communicating with the supply hole. The injection device of the exhaust gas purification system injects the reducing agent to an interior of the pipe through the supply hole.

5 Claims, 4 Drawing Sheets

(51) Int. Cl.
*F01N 3/035* (2006.01)
*F01N 13/00* (2010.01)
(52) U.S. Cl.
CPC .......... *F01N 3/035* (2013.01); *F01N 13/009* (2014.06); *F01N 2240/02* (2013.01); *F01N 2470/24* (2013.01); *F01N 2610/02* (2013.01); *F01N 2610/03* (2013.01); *F01N 2610/1453* (2013.01); *Y02T 10/24* (2013.01)

(56) References Cited

U.S. PATENT DOCUMENTS

2012/0255287 A1* 10/2012 Kowada ............. B01D 53/9431
60/295
2013/0164183 A1 6/2013 Iijima et al.

FOREIGN PATENT DOCUMENTS

| JP | 2011-99415 A | 5/2011 |
| JP | 2013-133773 A | 7/2013 |
| JP | 2013-142368 A | 7/2013 |
| WO | WO 2009/024815 A2 | 2/2009 |

OTHER PUBLICATIONS

Ijima et al. (JP2011099415A)—translated document.*
Kimura, H (JP5013121A)—translated document.*
Translation of the International Preliminary Report on Patentability corresponding to PCT/JP2014/076044 dated May 3,2016, 7 pages.
Search Report corresponding to PCT/JP2014/076044 dated Dec. 12, 2014, two pages.

* cited by examiner

Prior Art

EXHAUST GAS PURIFICATION SYSTEM

TECHNICAL FIELD

Techniques of the present disclosure relate to an exhaust gas purification system for purifying exhaust gas of an engine.

BACKGROUND ART

The engine installed in a vehicle is generally coupled to an exhaust gas purification system, which purifies exhaust gas discharged from the engine. The exhaust gas purification system includes a first housing for accommodating a filter and a second housing for accommodating a selective reduction catalyst, for example, as disclosed in Patent Document 1. The first housing is located upstream of the second housing in the flowing direction of exhaust gas. The filter, which is accommodated in the first housing, catches particulate matter contained in exhaust gas. The second housing is located downstream of the first housing in the flowing direction of the exhaust gas. The selective reduction catalyst, which is accommodated in the second housing, reduces NOx contained in the exhaust gas with a reducing agent. FIG. 7 is a schematic diagram showing the structure of a connection between the first housing and an injection device, which injects a reducing agent to the selective reduction catalyst.

As shown in FIG. 7, a first housing 111 includes an inner pipe 112 inside the first housing 111. The basal end of the inner pipe 112 is coupled to the inner circumferential surface of the first housing 111. The distal end of the inner pipe 112 is coupled to a portion around an outlet formed in the first housing 111. The circumferential wall of the inner pipe 112 includes a passage into which the exhaust gas E flows after exiting from the filter. The exhaust gas E that has exited from the filter exits to the outside of the first housing 111 through the interior of the inner pipe 112. An injection device 100 injects a reducing agent R to the exhaust gas E flowing inside the inner pipe 112.

The injection device 100 includes a main body 101 having an injection port 101a, through which the reducing agent R is injected, and a leg portion 102, which extends radially outward from the outer circumferential surface of the main body 101. Mounting holes 102a are formed in the leg portion 102 of the injection device 100, and stud bolts 103 pass through the mounting holes 102a. Internal threads 113a that mesh with the stud bolts 103 are formed in a mounting flange 113, which is located on the outer circumferential surface of the first housing 111. The stud bolts 103, which mesh with the internal threads 113a, fix the leg portion 102 of the injection device 100 to the mounting flange 113. Annular nuts 104 are located in the portions of the stud bolts 103 that protrude from the leg portion 102 away from the injection port 101a. The nuts 104 mesh with the stud bolts 103. The nuts 104 with the stud bolts 103 fix the leg portion 102 of the injection device 100 to the mounting flange 113.

PRIOR ART DOCUMENT

Patent Document

Patent Document 1: Japanese Laid-Open Patent Publication No. 2013-142368

SUMMARY OF THE INVENTION

Problem that the Invention is to Solve

The leg portion 102 of the injection device 100 and the mounting flange 113 of the first housing 111 are located on the outer circumferential surface of the first housing 111. When the vehicle travels, foreign substances scatter from the road surface over the outer circumferential surface of the first housing 111. Thus, the foreign substances strike the leg portion 102 of the injection device 100, the stud bolts 103, the nuts 104, and the mounting flange 113. This may loosen the connection between the mounting flange 113 of the first housing 111 and the leg portion 102 of the injection device 100 as well as the connection between the first housing 111 and the injection device 100.

Not only in a configuration in which the leg portion 102 of the injection device 100 is screwed to the mounting flange 113 but also in a configuration in which the leg portion of the injection device is welded to the mounting flange, for example, looseness of the connection between the first housing and the injection device is a common problem. In addition, in a configuration in which a part of the injection device other than the leg portion is coupled to the mounting flange and a configuration in which the leg portion of the injection device is coupled to a part of the housing other than the mounting flange, looseness of a connection between the first housing and the injection device is also a common problem. Furthermore, even in a configuration in which a part of the injection device other than the leg portion is coupled to a part of the housing other than the mounting flange, looseness of a connection between the first housing and the injection device is also a common problem.

An objective of the present disclosure is to provide an exhaust gas purification system that limits looseness of a connection between an injection device, which injects reducing agent, and a part of a housing that is a place to which the injection device is coupled.

Means for Solving the Problems

One aspect of an exhaust gas purification system according to the technique of the present disclosure includes an exhaust purifying element for purifying exhaust gas, a selective reduction catalyst for promoting reduction of NOx contained in the exhaust gas with a reducing agent, a housing for accommodating the exhaust purifying element, a pipe that is located inside the housing, and an injection device that is coupled to the bottom of the accommodating portion outside the housing. The housing includes an outer wall having an accommodating portion, which is recessed into the housing. A supply hole is formed on a bottom of the accommodating portion. The pipe has a passage through which an interior of the pipe communicates with an exterior of the pipe. The pipe is configured to guide exhaust gas toward the selective reduction catalyst through the passage and the interior of the pipe, and has an end communicating with the supply hole. The injection device injects the reducing agent to an interior of the pipe through the supply hole.

MODES FOR CARRYING OUT THE INVENTION

An exhaust gas purification system according to one embodiment of the present disclosure will now be described with reference to FIGS. 1 to 3. The exhaust gas purification system is installed in the exhaust passage of a diesel engine. In the following, the overall structure of the exhaust gas purification system, an injection device of the exhaust gas purification system, and its surrounding structure will be described in order.

[Overall Structure of Exhaust Gas Purification System]

The overall structure of the exhaust gas purification system will now be described with reference to FIG. 1.

Figure 1:
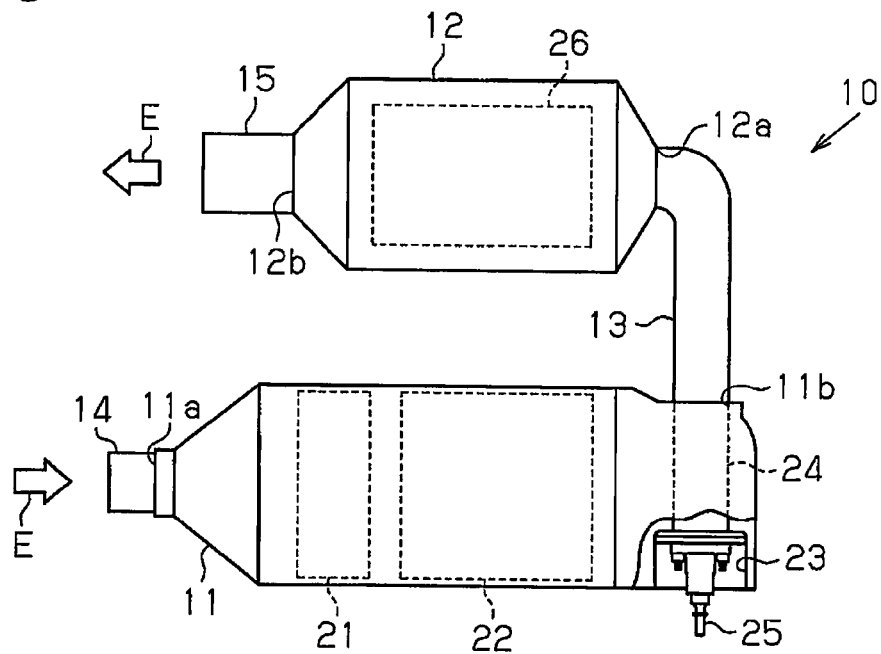
FIG. 1 is a schematic diagram of an exhaust gas purification system according to one embodiment of the present disclosure, illustrating the overall structure of the exhaust gas purification system.

As shown in FIG. 1, the exhaust gas purification system 10 includes a first housing 11 and a second housing 12 as examples of housings, and a connection pipe 13, which connects the first housing 11 to the second housing 12. The first housing 11 is located upstream of the second housing 12 in the flow direction of exhaust gas E. For example, the first housing 11 is shaped like a hollow cylinder and has two ends. An exhaust inlet 11$a$, which communicates with the interior of an upstream exhaust passage 14, is formed on one of the ends. An exhaust outlet 11$b$, which communicates with the interior of a connection pipe 13, is formed on the other end.

A diesel oxidation catalyst (DOC) 21 and a diesel particulate filter (DPF) 22 are located inside the first housing 11. The DOC 21 is located upstream of the DPF 22 in the flow direction of the exhaust gas E, and oxidizes the fuel of uncombusted fuel contained in the exhaust gas E. The DPF 22 captures particulate matter contained in the exhaust gas E that has exited from the DOC 21. Both the DOC 21 and the DPF 22 are examples of exhaust purifying elements.

The outer wall of the first housing 11 has a mounting cylindrical portion 23, which is recessed into the first housing 11. The mounting cylindrical portion 23 is an example of an accommodating portion and is located downstream of the DPF 22 in the flow direction of the exhaust gas E. The mounting cylindrical portion 23 is shaped like, for example, a hollow cylinder with a bottom, which is shaped like a disc. The bottom of the mounting cylindrical portion 23 includes an open supply hole in a portion that faces the exhaust outlet 11$b$.

The bottom of the mounting cylindrical portion 23 is coupled to an inner pipe 24 inside the first housing 11. The outer diameter of the inner pipe 24 is smaller than the diameter of the mounting cylindrical portion 23. The inner pipe 24 extends toward the exhaust outlet 11$b$ along a substantially straight line. The inner pipe 24 includes a plurality of through holes, which are passages that pass through between the exterior and the interior of the inner pipe 24. These through holes allow the interior of the inner pipe 24 to communicate with a portion corresponding to the interior of the first housing 11 and also corresponding to the exterior of the inner pipe 24. In addition, the interior of the inner pipe 24 communicates with the interior of the connection pipe 13 at the end at which the inner pipe 24 is coupled to the exhaust outlet 11$b$.

An injection device 25 is located inside the mounting cylindrical portion 23 and coupled to the bottom of the mounting cylindrical portion 23 outside the first housing 11. The injection device 25 injects a reducing agent, e.g., urea or fuel, through the supply hole, which is formed at the bottom of the mounting cylindrical portion 23, toward the interior of the inner pipe 24. The injection device 25 injects a reducing agent into the inner pipe 24 and causes exhaust gas E, which flows in the inner pipe 24 and the connection pipe 13, to deliver the reducing agent into the second housing 12.

The second housing 12 is shaped like, for example, a hollow cylinder, and has two ends. An exhaust inlet 12$a$ is formed at one end that is coupled to the connection pipe 13, and an exhaust outlet 12$b$, which is coupled to a downstream exhaust passage 15, is formed at the other end. A selective reduction catalyst (SCR catalyst) 26 is located inside the second housing 12. The SCR catalyst 26 prompts the reduction of nitrogen oxides (NOx) contained in the exhaust gas E with the reducing agent injected by the injection device 25. The SCR catalyst 26 may be a catalyst that prompts reduction of NOx using ammonia produced by thermal decomposition or hydrolysis of urea, or may be a catalyst that prompts reduction of NOx using fuel injected by the injection device 25, i.e., carbon hydride. This purifies the exhaust gas E that flows inside the second housing 12 with the SCR catalyst 26.

The connection pipe 13, which connects the first housing 11 to the second housing 12, is curved in a portion extending from the exhaust outlet 11$b$ of the first housing 11 to the exhaust inlet 12$a$ of the second housing 12.

In the exhaust gas purification system 10, when the exhaust gas E that has passed through the upstream exhaust passage 14 flows into the first housing 11, the DOC 21 oxidizes uncombusted fuel contained in the exhaust gas E, and the DPF 22 catches particulate matter contained in the exhaust gas E that has exited from the DOC 21. When the exhaust gas E that has exited from the DPF 22 passes through the interior of the inner pipe 24, the injection device 25 injects the reducing agent toward the exhaust gas E. The exhaust gas E with the reducing agent passes through the connection pipe 13 and flows into the second housing 12, so that the SCR catalyst 26 prompts selective reduction of NOx, which is contained in the exhaust gas E, with the reducing agent. In this manner, the exhaust gas purification system 10 purifies the exhaust gas E by reducing uncombusted fuel, particulate matter, and NOx, which are contained in the exhaust gas E flowing inside the exhaust gas purification system 10.

[Injection Device and Surrounding Structure]

The injection device 25 and its surrounding structure will now be described in detail with reference to FIGS. 2 and 3. In FIG. 3, for illustrative purposes, a temperature adjustment portion 40 is omitted.

Figure 2:
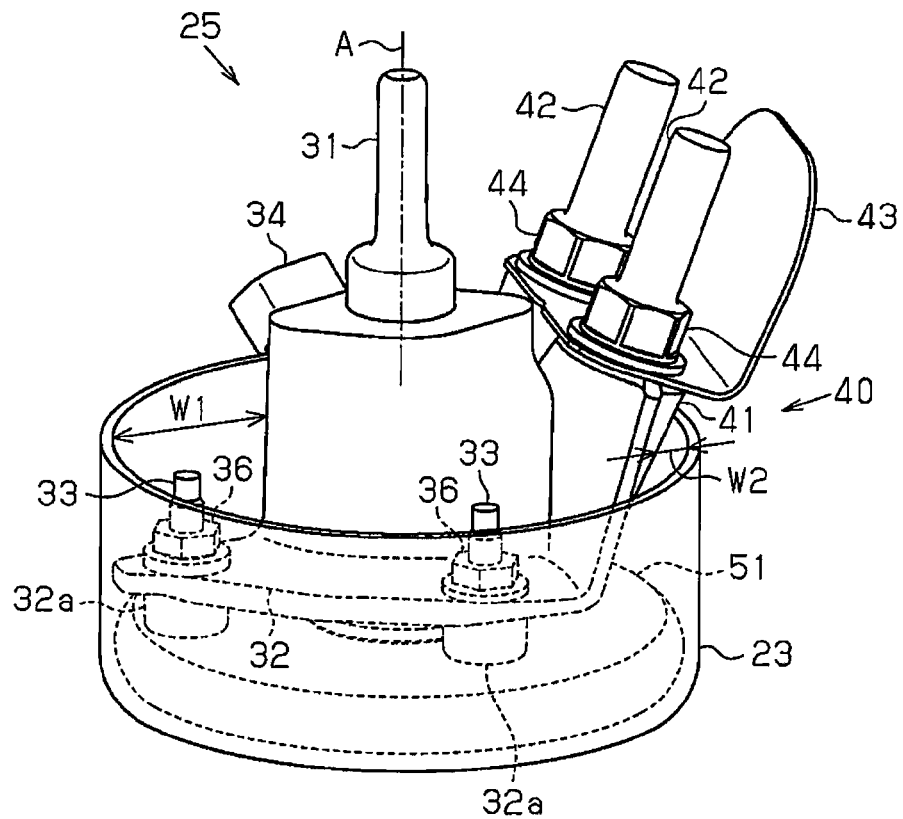
FIG. 2 is a perspective view showing an injection device and its surrounding structure in the exhaust gas purification system of FIG. 1.

As shown in FIG. 2, a portion of the injection device 25 is located inside the mounting cylindrical portion 23, which is an accommodating portion. The injection device 25 includes an injection main body 31, which is an example of a main body. The injection main body 31 is shaped like a substantially hollow cylinder that has the central axis A of the mounting cylindrical portion 23 as its center. Of two ends of the injection main body 31, one that is close to the exhaust outlet 11b is a distal end and the other end is a basal end. The injection main body 31 includes an injection port, which injects the reducing agent, at the distal end.

The injection device 25 includes a leg portion 32, which is coupled to the injection main body 31. The leg portion 32 extends radially outward from the outer circumferential surface of the injection main body 31, which is located in the mounting cylindrical portion 23. The end of the leg portion 32 that is coupled to the injection main body 31 is a basal end, and the end that is away from the injection main body 31 is a distal end. A plurality of distal mounting portions 32a is located on the surface at the distal end of the leg portion 32 at intervals in the circumferential direction. Each of the distal mounting portions 32a is shaped like a hollow cylinder, which extends in the extending direction of the central axis A toward the bottom of the mounting cylindrical portion 23. The distal end of the leg portion 32 and each of the distal mounting portions 32a include mounting holes, which extend through the leg portion 32 and the distal mounting portion 32a in the extending direction of the central axis A.

The injection device 25 is coupled to the temperature adjustment portion 40, which adjusts the temperature of the injection device 25, inside the mounting cylindrical portion 23. The injection device 25 and a temperature adjustment main body 41 of the temperature adjustment portion 40 are integrated.

A coolant passage is formed in the temperature adjustment main body 41. Engine coolant, which is an example of heating medium, flows through the coolant passage. The temperature adjustment main body 41 has two tubular pipe connectors 42. The pipe connectors 42 are coupled to the respective ends of different pipes, which guide the engine coolant. The pipe connectors 42 are located entirely outside the mounting cylindrical portion 23.

Of the two pipe connectors 42, one pipe connector 42 has an inlet of the engine coolant and is coupled to an end of the coolant passage of the temperature adjustment main body 41. The other pipe connector 42 has an outlet of the engine coolant and is coupled to the other end of the coolant passage of the temperature adjustment main body 41. Each of the pipe connectors 42 has an outer circumferential surface covered by, for example, an end of a resin hose, which is an example of a pipe. In each of the pipe connectors 42, an end that is coupled to the temperature adjustment main body 41 is a basal end, and the other end that is away from the temperature adjustment main body 41 is a distal end.

A guard plate 43 is fastened to the temperature adjustment main body 41 of the temperature adjustment portion 40 with fastening portions 44, which are located at the basal end of each of the pipe connectors 42. The guard plate 43 extends radially outward of the injection main body 31 of the injection device 25 and is bent substantially in the extending direction of the central axis A. When the vehicle travels, the guard plate 43 guards the pipe connectors 42 and the fastening portions 44 against foreign substances scattering toward the fastening portion 44.

The injection device 25 and the temperature adjustment main body 41 of the temperature adjustment portion 40, which are integrated, are located in the mounting cylindrical portion 23 in a state in which a clearance exists between the injection device 25 and the inner circumferential surface of the mounting cylindrical portion 23 and a clearance exists between the temperature adjustment main body 41 and the inner circumferential surface of the mounting cylindrical portion 23. The distance between the outer surface of the injection device 25 and the inner circumferential surface of the mounting cylindrical portion 23 is defined as W1, and the distance between the outer surface of the temperature adjustment main body 41 and the inner circumferential surface of the mounting cylindrical portion 23 is defined as W2. The distance W1 between the outer surface of the injection main body 31 and the inner circumferential surface of the mounting cylindrical portion 23 is substantially constant. However, the closer to the bottom of the mounting cylindrical portion 23, the greater the distance W2 between the outer surface of the temperature adjustment main body 41 and the inner circumferential surface of the mounting cylindrical portion 23 becomes.

In a configuration in which clearances with the distances W1 and W2 exist, the injection device 25 does not easily receive heat from the first housing 11, which is heated by exhaust gas. Accordingly, the temperature of the injection device 25 does not easily increase. As a result, it is easier to maintain the temperature of the injection device 25 at a temperature for maintaining the reducing agent in an appropriate state for use in the SCR catalyst 26. In addition, the temperature adjustment portion 40 does not easily receive heat from the first housing 11. Thus, the temperature of engine coolant, which flows in the temperature adjustment portion 40, does not easily increase. A portion close to the bottom of the mounting cylindrical portion 23 receives heat from the bottom of the mounting cylindrical portion 23 and the circumferential surface of the mounting cylindrical portion 23. Thus, the temperature of engine coolant that flows through the portion is especially likely to increase. Thus, in a configuration in which the closer to the bottom of the mounting cylindrical portion 23, the greater the distance W2 between the outer surface of the temperature adjustment main body 41 and the inner circumferential surface of the mounting cylindrical portion 23 becomes, the temperature of engine coolant flowing in the temperature adjustment portion 40 does not easily increase, even in a portion close to the bottom of the mounting cylindrical portion 23. Accordingly, it is easier to maintain the function of adjusting the temperature of the injection device 25 by the temperature adjustment portion 40. This increases the probability that the temperature of the reducing agent injected by the injection device 25 stays within a predetermined temperature range.

The pipe connectors 42 of the temperature adjustment portion 40 are located outside the mounting cylindrical portion 23. This facilitates the task of attaching pipes to the pipe connectors 42 and the task of detaching the pipes from the pipe connectors 42. Moreover, the pipes that are coupled to the pipe connectors 42 do not easily receive heat from the first housing 11. Thus, the temperature of the pipes is kept low in comparison with a configuration in which the pipe connectors 42 are located inside the mounting cylindrical portion 23. In contrast, in the configuration in which the pipe connectors 42 are located in the mounting cylindrical portion 23, a configuration of making the pipes of a material having greater heat resistance and a configuration of blocking heat transferred to the pipes are needed.

Figure 3:
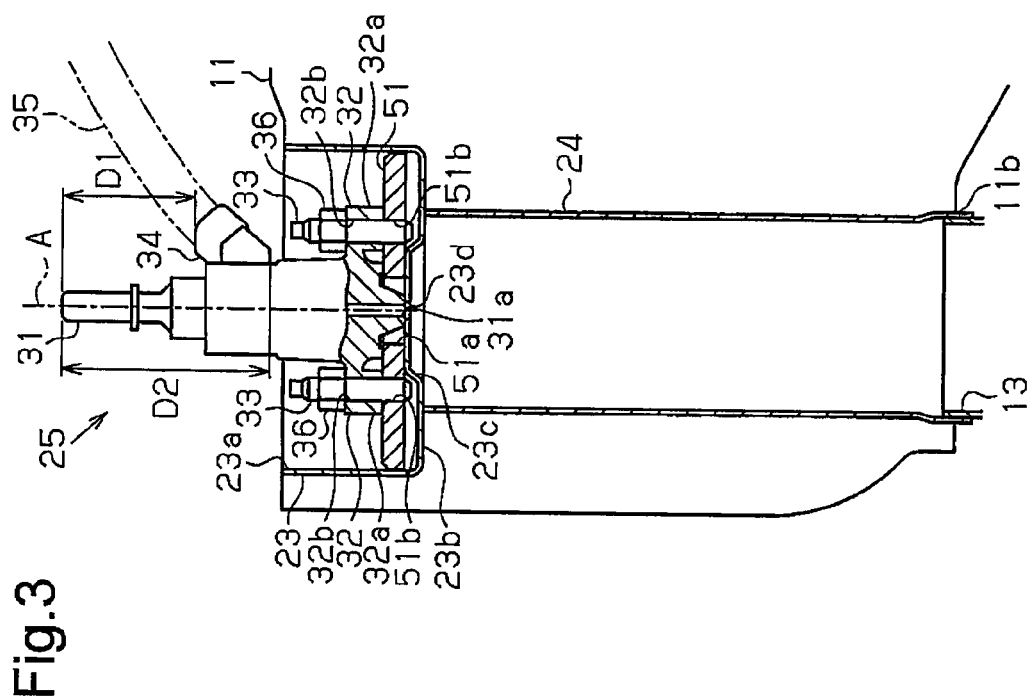
FIG. 3 is an enlarged view of the injection device and a part of its surrounding structure shown in FIG. 2 with the leg portion of the injection device and the mounting flange cut away.

As shown in FIG. 3, the mounting cylindrical portion 23 has an opening 23a on the outer circumferential surface of the first housing 11 and a disk-shaped bottom 23b at the end close to the exhaust outlet 11b. The bottom 23b of the mounting cylindrical portion 23 has a bump 23c, which extends away from the exhaust outlet 11b and is shaped like a truncated cone having a central axis A of the mounting cylindrical portion 23 as a center. The bump 23c has a supply hole 23d, which extends through the bottom 23b in the extending direction of the central axis A at a location through which the central axis A passes.

A mounting flange 51, which is shaped like a disk having the central axis A as the center, is joined to the bump 23c of the mounting cylindrical portion 23 by, e.g., adhering and welding. The outer diameter of the mounting flange 51 may be substantially equal to or smaller than, e.g., the inner diameter of the mounting cylindrical portion 23. The mounting flange 51 has a flange hole 51a, which is a circular through hole having the central axis A as the center. The mounting flange 51 is joined to the top surface of the bump 23c in a state in which the center of the flange hole 51a and the center of the supply hole 23d are located on the central axis A.

The injection device 25 is located on the mounting flange 51. The injection main body 31 of the injection device 25 is located inside the mounting cylindrical portion 23 in a state in which an injection port 31a is located on the central axis A in the flange hole 51a. Thus, the reducing agent injected by the injection device 25 is supplied into the inner pipe 24 through the flange hole 51a of the mounting flange 51 and the supply hole 23d of the mounting cylindrical portion 23.

The injection port 31a of the injection device 25 is located inside the mounting cylindrical portion 23, which is the outer wall of the first housing 11, which is recessed into the first housing 11. Thus, in comparison with a configuration in which the entire injection device 25 is located in the exterior of the mounting cylindrical portion 23, the distance between the injection port 31a and the end of the inner pipe 24 that is coupled to the connection pipe 13 in a direction of the central axis A is short. Thus, even if the reducing agent injected by the injection device 25 spreads by the same distance in the radial direction of the inner pipe 24, the reducing agent does not easily adhere to the inner circumferential surface of the inner pipe 24. Especially, when the inner pipe 24 has a plurality of through holes, the reducing agent does not easily close the through holes, and the reducing agent does not easily leak to the outside of the inner pipe 24 through the through holes.

The mounting flange 51 includes internal threads 51b, which extend along the central axis A. The injection device 25 is located on the mounting flange 51 in a state in which the internal threads 51b and the mounting holes 32b of the distal mounting portions 32a of the leg portion 32 face each other.

The stud bolts 33, which are examples of bolts meshing with the internal threads 51b, pass through the mounting holes 32b of the leg portion 32. The stud bolts 33 are examples of fastening members and fasten the injection main body 31 to the mounting flange 51, in particular, to the bottom 23b of the mounting cylindrical portion 23. Each of the stud bolts 33 extends through the leg portion 32 and the mounting flange 51 in the extending direction of the central axis A, and the head of the stud bolt 33 faces the opening 23a of the mounting cylindrical portion 23. The entire portion of the stud bolt 33 that extends in the direction of the central axis A is located inside the mounting cylindrical portion 23.

Each of the stud bolts 33 extends from the leg portion 32 toward the basal end of the injection main body 31. An annular nut 36 is located in a portion of the stud bolt 33 that projects from the leg portion 32. The nut 36 has a thread, which meshes with the corresponding stud bolt 33. The nut 36 pushes the leg portion 32 against the mounting flange 51 by fastening the nut 36 to the corresponding stud bolt 33. Thus, the nut 36 with the stud bolt 33 fixes the leg portion 32 of the injection device 25 to the mounting flange 51 inside the mounting cylindrical portion 23.

In the above-illustrated configuration, the injection device 25 is coupled to the bottom 23b of the mounting cylindrical portion 23. Accordingly, when foreign substances scatter from the outside of the first housing 11 toward the outer circumferential surface of the first housing 11, a portion in which the injection device 25 and the first housing 11 are coupled to each other, i.e., a portion in which the mounting flange 51 and the first housing 11 are coupled to each other, and a portion in which the stud bolts 33 are fastened to the internal threads 51b of the mounting flange 51, are located inside the mounting cylindrical portion 23. Thus, the portion in which the injection device 25 and the first housing 11 are coupled to each other is guarded by a portion of the outer wall of the first housing 11 that is located outside the portion in which the injection device 25 and the first housing 11 are coupled to each other. This limits looseness of the connection between the injection device 25, which injects the reducing agent, and the mounting flange 51, which is a portion of the first housing 11 where the injection device 25 connects.

In addition, in the above configuration, the nuts 36, which, with the stud bolts 33, fix the injection device 25 to the mounting flange 51, are also located inside the mounting cylindrical portion 23. In the conventional exhaust gas purification system shown in FIG. 7, especially, when foreign substances strike the nuts 104, the joint between the nuts 104 and the stud bolts 103 may be loosened. In such a case, the connection between the first housing 111 and the injection device 100 is easily loosened. In this point, since the nuts 36 are located inside the mounting cylindrical portion 23 in the configuration, the outer wall of the first housing 11 also guards the nuts 36 when foreign substances scatter from the outside of the first housing 11 toward the outer circumferential surface of the first housing 11. Thus, the configuration of the exhaust gas purification system 10 is more preferable for limiting looseness of the connection between the first housing 11 and the injection device 25.

Moreover, in the above-illustrated configuration, the outer wall of the first housing 11 also entirely guards the stud bolts 33 since the entire stud bolts 33 are located inside the mounting cylindrical portion 23. Accordingly, the configuration of the exhaust gas purification system 10 is more preferable for limiting looseness of the connection between the first housing 11 and the injection device 25.

Figure 7:
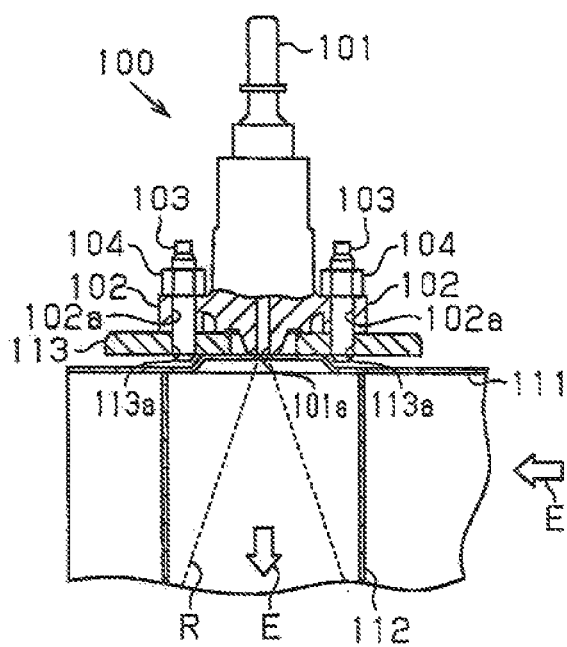
FIG. 7 is an enlarged-view of an injection device and a part of its surrounding structure in a conventional exhaust gas purification system with a leg portion of the injection device and a mounting flange cut away.

In the conventional configuration shown in FIG. 7, a guard member different from the first housing 11 is needed to guard a portion in which the first housing 11 is coupled to the injection device 25 against foreign substances that scatter from the outside. For example, the guard member covers the connection between the first housing 11 and the injection device 25. However, the above-illustrated exhaust gas purification system 10 allows the outer wall of the first housing 11 to guard the portion in which the first housing 11 is coupled to the injection device 25. Thus, the aforementioned guard member is unnecessary, thereby omitting the costs of the guard member.

The heads of the stud bolts 33 face the opening 23a of the mounting cylindrical portion 23. Thus, although the entire stud bolts 33 are located inside the mounting cylindrical portion 23, a task of screwing the injection device 25 to the bottom 23b of the mounting cylindrical portion 23 and a task of detaching the injection device 25 from the bottom 23b of the mounting cylindrical portion 23 are easier.

The injection device 25 has a connector 34 coupled to the injection main body 31. The connector 34 is shaped like a tube that extends radially outward from the outer circumferential surface of the injection main body 31, which is located outside the mounting cylindrical portion 23. One of the ends of the connector 34 is coupled to the injection main body 31. The end is a basal end, and the end that is away from the injection main body 31 is a distal end. The basal end of the connector 34 is located outside the mounting cylindrical portion 23. The connector 34 is made of resin. In particular, it is preferable that the connector 34 is made of synthetic resin. The connector 34 is coupled to a cable 35. The cable 35 includes a wire for transmitting a control signal, which controls operation of the injection main body 31 injecting a reducing agent and a wire for supplying electric power to the injection main body 31.

The injection main body 31 extends in a direction of the central axis A. In the direction, the distance D1 between the basal end of the injection main body 31 and the distal end of the connector 34 is shorter than the distance D2 between the basal end of the injection main body 31 and the basal end of the connector 34. In other words, the closer to the distal end of the connector 34, the shorter the distance between the connector 34 and the basal end of the injection main body 31 along the central axis A becomes. Thus, the entire connector 34 is located outside the mounting cylindrical portion 23. This allows the entire connector 34 to be likely to be exposed to the outside air. Accordingly, even if heat from the exhaust gas flowing in the first housing 11 is transferred to the first housing 11, the heat is not easily transferred to the connector 34 so that the temperature of the connector 34 does not easily exceed the temperature at which the material of the connector 34 is softened. Moreover, the distance between the outer wall of the first housing 11 and the connector 34 at the distal end of the connector 34 is longer than the distance at the basal end of the connector 34. Thus, in comparison with the configuration in which the distance between the basal end of the injection main body 31 and the connector 34 along the central axis A is constant across the connector 34, the connector 34 does not easily receive heat.

In a configuration in which the entire connector is located inside the mounting cylindrical portion 23, a configuration for blocking heat to the connector is needed not to easily receive heat from the first housing 11. Alternatively, in a configuration in which the entire connector is located inside the mounting cylindrical portion 23, the material of the connector needs to have greater heat resistance. However, in the above-illustrated exhaust gas purification system 10, a configuration for blocking heat to the connector 34 and a material having greater heat resistance may be omitted by decreasing the temperature of the connector 34, thereby reducing the costs of the exhaust gas purification system 10.

As described above, the exhaust gas purification system according to the present embodiment achieves the following advantages.

(1) When foreign substances scatter from the outside of the first housing 11 toward the outer circumferential surface of the first housing 11, a portion in which the injection device 25 and the first housing 11 are coupled to each other is guarded by the outer wall of the first housing 11, which is located outside the portion in which the injection device 25 and the first housing 11 are coupled to each other. Accordingly, looseness of the connection between the injection device 25, which injects a reducing agent, and a portion of the first housing 11 where the injection device 25 connects, is limited.

(2) Since the entire connector 34 is likely to be exposed to the outside air, the temperature of the connector 34 is low in comparison with a configuration that the connector 34 is located in the mounting cylindrical portion 23.

(3) Although the entire stud bolts 33 are located inside the mounting cylindrical portion 23, a task of screwing the injection device 25 to the bottom 23b of the mounting cylindrical portion 23 and a task of detaching the injection device 25 from the bottom 23b of the mounting cylindrical portion 23 are easier.

(4) A task of attaching a pipe to the pipe connectors 42 and a task of detaching the pipe from the pipe connectors 42 are easier.

The above-illustrated embodiment may be modified in the following manners.

In the temperature adjustment portion 40, the entire pipe connectors 42 do not necessarily need to be located outside the mounting cylindrical portion 23. As long as at least a part of the pipe connectors 42 are located outside the mounting cylindrical portion 23, an advantage equivalent to the aforementioned advantage (4) is achieved. Alternatively, the entire pipe connectors 42 may be located inside the mounting cylindrical portion 23. With such a configuration, advantages equivalent to the advantages (1) to (3) are achieved, and the looseness of the connection between the pipe connectors 42 and a different pipe coupled to the pipe connectors 42 is limited.

Heating medium flowing in the temperature adjustment portion 40 does not necessarily need to be engine coolant. The heating medium may flow in a cooling circuit independent from the cooling circuit of the engine.

Instead of a configuration in which the stud bolts 33 and the mounting holes 32b extend in the extending direction of the central axis A, the stud bolts 33 and the mounting holes 32b may extend at a predetermined angle from the central axis A. With the configuration, as long as the heads of the stud bolts 33 face the opening 23a of the mounting cylindrical portion 23, an advantage equivalent to the aforementioned advantage (3) should be achieved.

The heads of the stud bolts 33 do not necessarily need to face the opening 23a of the mounting cylindrical portion 23. Even with the configuration, as long as the injection device 25 is coupled to the bottom 23b of the mounting cylindrical portion 23 of the first housing 11, an advantage equivalent to the aforementioned advantage (1) is achieved. An advantage equivalent to the aforementioned advantage (3) is well achieved.

The stud bolts 33 do not necessarily need to face the opening 23a of the mounting cylindrical portion 23. For example, the stud bolts 33 may be configured face away from the opening 23a of the mounting cylindrical portion 23 by covering the stud bolts 33 with another member. Even with the configuration, as long as the injection device 25 is coupled to the bottom 23b of the mounting cylindrical portion 23 of the first housing 11, an advantage equivalent to the aforementioned advantage (1) is achieved.

The stud bolts 33 do not necessarily need to couple the injection device 25 to the bottom 23b of the mounting cylindrical portion 23. For example, the leg portion 32 of the injection device 25 may adhere to the mounting flange 51 with adhesive. The leg portion 32 may be welded to the mounting flange 51. Alternatively, the injection device 25 may be fixed by the leg portion 32 and a clamp that holds the leg portion 32 and the mounting flange 51 in the extending direction of the central axis A. The leg portion 32 of the injection device 25 may be coupled to a portion other than the mounting flange 51, e.g., a portion of the bottom 23b of the mounting cylindrical portion 23 by any one of the aforementioned methods. Furthermore, a portion of the injection device 25 other than the leg portion 32 may be coupled to a portion other than the mounting flange 51 by any one of the aforementioned methods. Even with any one of these configurations, an advantage equivalent to the aforementioned advantage (1) is achieved.

The distance D2 between the basal end of the connector 34 and the basal end of the injection main body 31 may be equal to the distance D1 between the distal end of the connector 34 and the basal end of the injection main body 31. Even with the configuration, if the basal end of the connector 34 is located outside the first housing 11, the entire connector 34 is likely to be exposed to the outside air. Thus, an advantage equivalent to the aforementioned advantage (2) is achieved.

The distance D2 between the basal end of the connector 34 and the basal end of the injection main body 31 may be shorter than the distance D1 between the distal end of the connector 34 and the basal end of the injection main body 31. Even with the configuration, if the basal end of the connector 34 is located outside the mounting cylindrical portion 23, at least a part of the connector 34 is located outside the mounting cylindrical portion 23. Since at least a part of the connector 34 is likely to be exposed to the outside air, in comparison with a configuration in which the entire connector 34 is located inside the mounting cylindrical portion 23, the temperature of the connector 34 is well decreased.

The entire connector 34 may be located inside the mounting cylindrical portion 23. Even with the configuration, if the injection device 25 is coupled to the bottom of the mounting cylindrical portion 23, an advantage equivalent to the aforementioned advantage (1) is achieved. In this case, preferably, the connector 34 is made of resin, in particular, a material having greater heat resistance. Alternatively, preferably, the connector 34 is made of metal having greater heat resistance than resin and the like.

The connector 34 may be made of a material other than resin, e.g., metal.

The entire stud bolts 33 do not necessarily need to be located inside the mounting cylindrical portion 23. A part of the stud bolts 33 may be located outside the mounting cylindrical portion 23 in the first housing 11. Even with the configuration, if a portion in which the above-illustrated injection device 25 and the first housing 11 are coupled to each other is located inside the mounting cylindrical portion 23, an advantage equivalent to the aforementioned advantage (1) is well achieved.

The entire nuts 36 may be located outside the mounting cylindrical portion 23. If a portion in which the above-illustrated injection device 25 and the first housing 11 are coupled to each other is located inside the mounting cylindrical portion 23, an advantage equivalent to the aforementioned advantage (1) is well achieved.

A portion in which the stud bolts 33 and the internal threads 51b of the mounting flange 51 are fastened to each other may be located outside the mounting cylindrical portion 23. Even with the configuration, if a portion in which the first housing 11 and the mounting flange 51 are joined is located inside the mounting cylindrical portion 23, an advantage equivalent to the aforementioned advantage (1) is well achieved.

The entire injection main body 31 of the injection device 25 may be located inside the mounting cylindrical portion 23 in the first housing 11. Even with the configuration, the aforementioned advantage (1) is achieved. When the mounting cylindrical portion 23 has a depth to accommodate the entire injection main body 31, the distance between the injection port 31a and the end of the inner pipe 24 that is coupled to the connection pipe 13 in a direction of the central axis A is further decreased. Thus, it is less likely that a reducing agent adheres to the inner circumferential surface of the inner pipe 24.

As long as the inner pipe 24 is located inside the first housing 11 to guide exhaust gas to the SCR catalyst 26, the inner pipe 24 and the connection pipe 13 may be embodied as one pipe. Alternatively, the inner pipe 24 may extend from the inside to the outside of the first housing 11 and be coupled to the connection pipe 13 in a portion between the first housing 11 and the second housing 12. Furthermore, the inner pipe 24 may be configured to guide exhaust gas toward the SCR catalyst located inside the first housing 11.

The DPF 22 may be located upstream of the DOC 21 inside the first housing 11.

An exhaust purifying element located inside the first housing 11 may be the DOC 21 or the DPF 22. Alternatively, an element capable of purifying exhaust gas other than the DOC 21 and the DPF 22 may be included. Furthermore, at least one of the DOC 21 and the DPF 22 may be replaced by another element.

An exhaust purifying element such as a catalyst and a filter may be located inside the second housing 12 in addition to the SCR catalyst 26.

Figure 4:
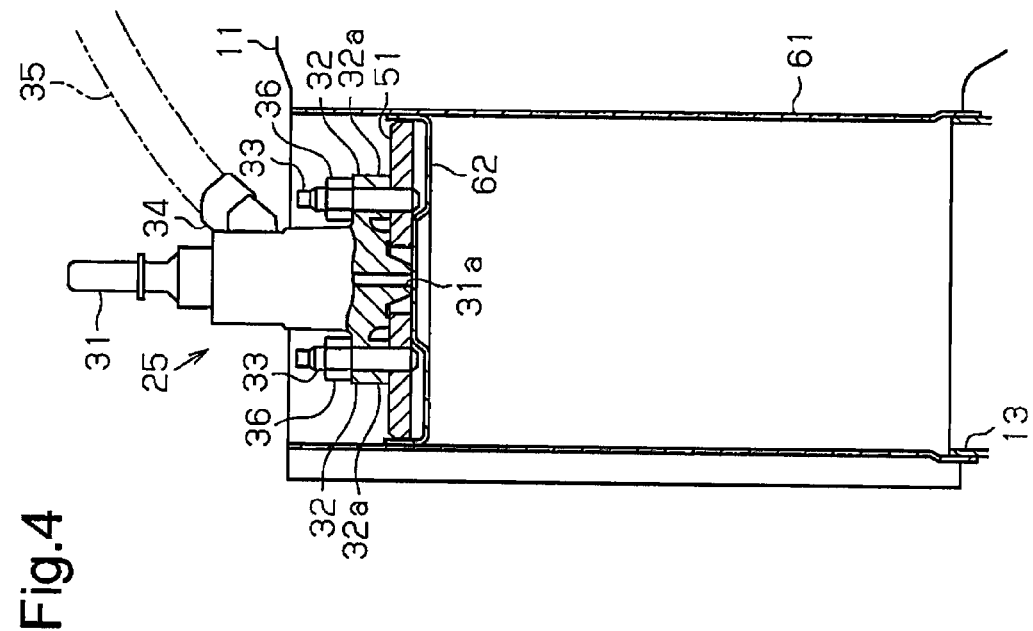
FIG. 4 is an enlarged view of an injection device and a part of its surrounding structure according to a modification with the leg portion of the injection device and the mounting flange cut away.

As shown in FIG. 4, the inner diameter of an inner pipe 61 and the outer diameter of a cylindrical mounting portion 62 may be substantially equal to each other, and the outer circumferential surface of the cylindrical mounting portion 62 may be welded or adhered to the inner circumferential surface of the inner pipe 61. In other words, the outer wall of the first housing 11 may include a part of the inner pipe 61 and the cylindrical mounting portion 62, and a part of the inner pipe 61 and the cylindrical mounting portion 62 may constitute an accommodating portion, which is recessed into the first housing 11. The remaining portion of the inner pipe 61 corresponds to a pipe. With the configuration, the difference between the outer diameter of the mounting portion and the outer diameter of the inside pipe does not create unevenness inside the first housing 11. This limits turbulence of exhaust gas inside the first housing 11.

In the configuration shown in FIG. 4, the mounting flange 51 may be located inside the inner pipe 61, and the cylindrical mounting portion 62 may be omitted. In such a case, if the outer diameter of the mounting flange 51 and the inner diameter of the inner pipe 61 are equal, the injection device 25 is coupled to the inner pipe 61 only with the mounting flange 51. Thus, the structure of the exhaust gas purification system 10 is less complicated than the configuration shown in FIG. 4. Accordingly, the productivity of the exhaust gas purification system 10 is increased, and the production costs of the exhaust gas purification system 10 are decreased. The outer diameter of the mounting flange 51 may be smaller than the inner diameter of the inner pipe 61. The shape of the mounting flange 51 may be a polygon instead of a disc. In the configuration, another member closes a gap created between the inner circumferential surface of the inner pipe 61 and the outer circumferential surface of the mounting flange 51.

Figure 5:
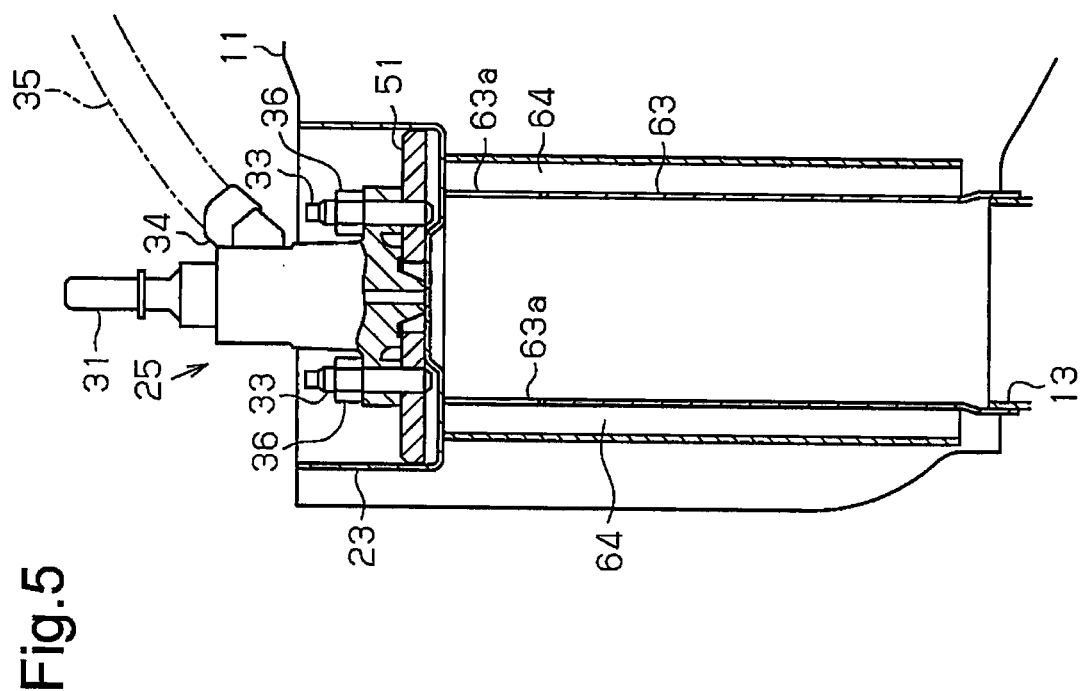
FIG. 5 is an enlarged view of an injection device and a part of its surrounding structure according to another modification with a leg portion of the injection device and a mounting flange cut away.

As shown in FIG. 5, an inner pipe 63 may have a guide 64 for forming a swirling flow of exhaust gas around the inner pipe 63. The guide 64 extends radially outward from the outer circumferential surface of the inner pipe 63. The inner pipe 63 may have one or more guides 64. In this configuration, one of two ends of the inner pipe 63 that is coupled to the mounting cylindrical portion 23 preferably has an exhaust inlet 63a as one example of a passage. The inner pipe 63 may have one exhaust inlet 63a or may have a plurality of exhaust inlets 63a that are spaced from each other in the circumferential direction. Thus, the swirling flow of exhaust gas, which the guide 64 forms, flows from the exhaust inlet 63a to the interior of the inner pipe 63. Thus, the swirling flow of exhaust gas formed inside the inner pipe 63 facilitates mixing a reducing agent injected by the injection device 25 with exhaust gas. As a result, it is easier for the exhaust gas to carry the reducing agent to the second housing 12. When the reducing agent is urea, thermal decomposition and hydrolysis of urea are promoted, thereby facilitating production of ammonia.

In the configuration shown in FIG. 5, the inner pipe 63 may have a plurality of through holes as examples of passages.

Figure 6:
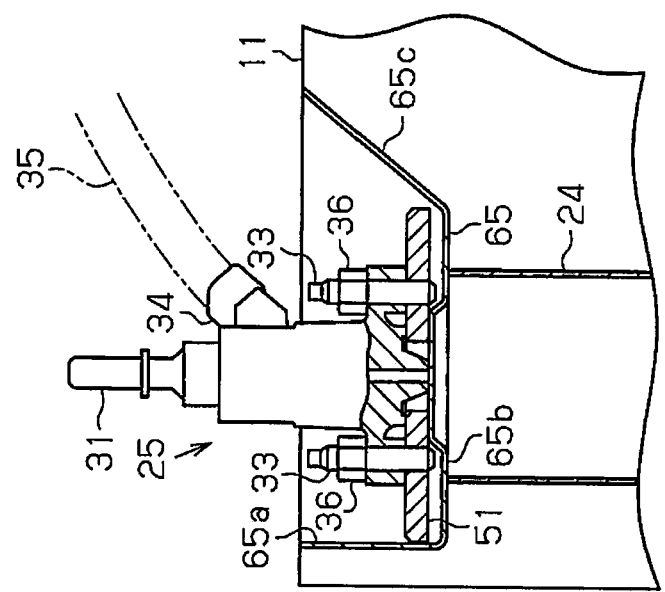
FIG. 6 is an enlarged-view of an injection device and a part of its surrounding structure according to another modification with a leg portion of the injection device and a mounting flange cut away.

As shown in FIG. 6, a mounting cylindrical portion 65, which is an accommodating portion recessed into the first housing 11 in the outer wall of the first housing 11, does not necessarily need to be shaped like a hollow cylinder. For example, the mounting cylindrical portion 65 may have an inclined portion 65c in an upstream part of the circumferential wall of the mounting cylindrical portion 65. The inclined portion 65c is formed to increase the size in the radial direction of the mounting cylindrical portion 65 from the bottom 65b of the mounting cylindrical portion 65 toward the opening 65a. With the configuration, exhaust gas flowing in the first housing 11 flows along the inclined portion 65c and is led to the inner pipe 24. This limits the turbulence of the exhaust gas.

In the configuration shown in FIG. 6, the circumferential entirety in the circumferential wall of the mounting cylindrical portion 65 may be the inclined portion 65c. The inclined portion 65c has the radial size increasing from the bottom 65b to the opening 65a. With the configuration, in comparison with a configuration in which the mounting cylindrical portion 65 has the inclined portion 65c in a part of the circumferential wall, the manufacture of the mounting cylindrical portion 65 is easier.

The engine in which the exhaust gas purification system 10 is installed is not limited to a diesel engine. For example, the exhaust gas purification system 10 may be installed in another type of engine such as a gasoline engine.

The invention claimed is:

1. An exhaust gas purification system comprising:
   an exhaust purifying element for purifying exhaust gas;
   a selective reduction catalyst for promoting reduction of NOx contained in the exhaust gas with a reducing agent;
   a housing for accommodating the exhaust purifying element, wherein
      the housing includes an outer wall, wherein an exterior surface of the housing defines a cylindrical accommodating portion, which is recessed into the housing, and
      a supply hole is formed on a bottom of the accommodating portion;
   a pipe that is located inside the housing and has a passage through which an interior of the pipe communicates with an exterior of the pipe, wherein
      the pipe is configured to guide exhaust gas toward the selective reduction catalyst through the passage and the interior of the pipe, and
      the pipe has an end communicating with the supply hole; and
   an injection device that is coupled to the bottom of the accommodating portion outside the housing and injects the reducing agent to an interior of the pipe through the supply hole; and
   a fastening member that fastens the injection device to the bottom of the cylindrical accommodating portion, wherein the entire fastening member is located inside the cylindrical accommodating portion, and the fastening member faces an opening of the cylindrical accommodating portion.

2. The exhaust gas purification system according to claim 1, wherein
   the injection device further includes a connector made of resin, and
   at least a part of the connector is located outside the accommodating portion.

3. The exhaust gas purification system according to claim 2, wherein the entire connector is located outside the accommodating portion.

4. The exhaust gas purification system according to claim 2, wherein
   the injection device includes a body, which extends in a direction,
   the body has two ends in the extending direction of the body,
   one of the ends is a distal end at which an injection port is formed,
   the other end is a basal end,
   the connector extends in a direction,
   the connector has two ends in the extending direction of the connector,
   one of the ends of the connector is a basal end, which is coupled to the body,
   the other end of the connector is a distal end,
   in the extending direction of the body, a distance between the basal end of the body and the distal end of the connector is shorter than a distance between the basal end of the body and the basal end of the connector, and
   the basal end of the connector is located outside the accommodating portion.

5. The exhaust gas purification system according to claim 1, further comprising a temperature adjustment portion that contacts the injection device inside the accommodating portion and is configured to adjust a temperature of the injection device using heating medium, wherein
   the temperature adjustment portion includes a pipe connector, which is coupled to a pipe guiding the heating medium, and
   at least a part of the pipe connector is located outside the accommodating portion.

* * * * *